Patented Apr. 7, 1953

2,634,192

UNITED STATES PATENT OFFICE 2,634,192

METHOD OF REMOVING IRON FROM CAUSTIC SODA SOLUTIONS

William N. Smith, Lake Jackson, Tex., assignor to The Dow Chemical Company, Midland, Mich., a corporation of Delaware No Drawing. Application June 28, 1951, Serial No. 234,150

4 Claims. (Cl. 23—184)

The invention relates to the art of purifying caustic soda solutions. It more particularly concerns an improved method of removing iron from aqueous caustic soda solutions present therein as an impurity.

Commercial aqueous caustic soda solutions unless especially treated or prepared are generally contaminated with dissolved iron in amount ranging from about 10 to about 100 parts more or less per million of NaOH on the dry basis. For some uses, the presence of the iron impurity is disadvantageous and its removal or reduction in amount is necessary. With available methods, the removal of the iron impurity is not satisfactory from solutions containing upwards of about 40 per cent of NaOH due largely to the difficulty of removing the usual purifying agents by filtration.

It is an object of the present invention to provide an improved method of removing dissolved iron as impurity from concentrated aqueous caustic soda solutions. Other objects and advantages will become apparent as the description of the invention proceeds.

The invention is predicated upon the discovery that by suitably calcining magnesium hydroxide to form magnesium oxide and comminuting the calcined magnesium oxide product, the resulting comminuted product, on being mixed with the iron contaminated caustic soda solution heated to at least 105° C., takes up the iron impurity and may be thereafter filtered readily from the solution through a porous carbon filter leaving the solution free from undesirable amounts of the iron contaminant. The invention then consists of the improved iron removal method herein fully described and particularly pointed out in the claims.

In carrying out the invention, magnesium hydroxide produced by precipitation from aqueous solution containing a soluble magnesium salt with a suitable hydroxide precipitant, such as lime (hydrated CaO), is calcined and comminuted to form the iron removal agent. A preferred source of the magnesium hydroxide is that produced by liming sea water and separating the resulting precipitate from the liquid. Calcination is effected by heating the precipitated magnesium hydroxide, as in a kiln, until a substantially anhydrous or more or les dead burned magnesium oxide product is obtained having a bulk density of more than about 70 pounds per cubic foot when comminuted to pass through a No. 100 standard sieve. This requires that the precipitated magnesium hydroxide, subjected to calcination, be heated to at least about 950° C. or preferably 1000° to 1150° C. in the calcination operation. It will be understood that the precipitated magnesium hydroxide need not be especially purified before calcination. The normal impurities acquired by the magnesium hydroxide as precipitated in and filtered from sea water do not adversely affect its action as an iron removing agent on being suitably calcined, comminuted, and used according to the invention. For example, calcined magnesium hydroxide comprising 80 per cent MgO, the balance being largely other refractory oxides, e. g. $SiO_2$, CaO, $Al_2O_3$, $Fe_2O_3$, acquired from the sea water, may be present. As ordinarily precipitated from sea water by milk of lime, the impure magnesium hydroxide obtained yields a magnesia on calcination containing about 88 per cent of MgO. The so-prepared magnesium oxide product is suitably comminuted to a particle size passing through a No. 200 standard sieve and preferably a No. 325 before use. The comminuted material may be as fine as 400 mesh.

The comminuted calcined magnesium oxide product is mixed with the concentrated (40-70 per cent NaOH by weight) caustic soda solution to be purified and the mixture is agitated for about 10 to 30 minutes or preferably about 15 minutes, while the mixture is maintained at a temperature above about 105° C. but below the atmospheric boiling point of the caustic soda solution. The amount of calcined magnesium oxide product required is from about 3 to 15 pounds per ton of NaOH in the caustic soda solution. A generally effective amount is about 7.5 pounds per ton of NaOH.

After mixing and agitating the calcined magnesium oxide product with the caustic soda solution, the mixture is filtered while hot, i. e., above about 105° C., so as to separate the so-treated caustic soda solution from the resulting suspended iron-containing magnesium oxide material. This is accomplished by filtering the mixture through porous carbon having a suitable size of pore openings, e. g. between 0.0003 inch and 0.0008 inch in diameter. The caustic soda filtrate thereby obtained is sufficiently free from iron to be usable for the usual commercial purposes requiring substantially iron-free caustic soda solution.

The following examples are illustrative of the practice of the method:

Example 1

7.5 liters of a 50 per cent aqueous solution of caustic soda, containing 55 p. p. m. of dissolved iron, was treated by mixing therewith 20 grams of calcined dense magnesium oxide while the mixture was maintained at about 125° C. The magnesium oxide used was obtained by calcining at 1000° C. magnesium hydroxide precipitated from sea water by lime, the calcination being continued until the material, on being comminuted to pass a No. 100 sieve, had a bulk density of 80 pounds per cubic foot. The calcined product contained 12 per cent of CaO, the balance being substantially all MgO. The mixture of the caustic soda solution and the calcined magnesium oxide was agitated for 20 minutes then filtered through the wall of a porous carbon tube having an area of 0.182 square foot with pore openings about 0.0005 inch in diameter. The first portion of filtrate passing through the carbon tube filter was cloudy. The cloudy portion of the filtrate was discarded and filtering was continued until the filtrate became clear. Analysis of a 3500 milliliter sample of the clear filtrate showed an iron content of not over 6 p. p. m. The rate of filtration when the filtrate came clear was 714 milliliters per minute.

*Example 2*

7.5 liters of 50 per cent aqueous caustic soda solution containing 51 p. p. m. of iron was mixed with 35 grams of a finely pulverized magnesium oxide product prepared by calcining at 1000° C. magnesium hydroxide precipitated from sea water, the calcined product comprising 88 per cent MgO and about 12 per cent of CaO. The mixture of the caustic soda solution and the calcined magnesium oxide product was held at 115° C. for 20 minutes, cooled to 115° C., and then filtered through a porous carbon filter having pore openings about 0.0005 inch in diameter. The area of the filter was 26.3 square inches. The pressure drop through the filter was 9 pounds per square inch. 3000 milliliters were filtered in 5 minutes. The so-treated and filtered caustic soda solution obtained contained 5 p. p. m. of iron.

*Example 3*

6.5 liters of 50 per cent aqueous caustic soda solution containing 51 p. p. m. of iron was mixed with 55 grams of finely pulverized calcined magnesium oxide prepared by calcining at 1300° C. magnesium hydroxide precipitated from sea water by lime. The mixture of caustic soda solution and magnesium oxide was held at about 129° C. for 20 minutes then cooled to 100° C. before filtering. The cooled mixture was filtered through a porous carbon having an area of 26.3 square inches using 9 pounds pressure across the filter. 3000 milliliters of the clear treated caustic soda solution was obtained in 6.8 minutes containing not over 4 p. p. m. of iron.

I claim:

1. A method of removing iron impurity from aqueous caustic soda solutions containing from 40 to 70 per cent of NaOH by weight which comprises calcining precipitated magnesium hydroxide at a temperature between about 950° and 1150° C. until the bulk density of the calcined product comminuted to pass a No. 100 standard sieve is at least 70 pounds per cubic foot, mixing the comminuted calcined product with the caustic soda solution in the proportions of 3 to 15 pounds thereof per ton of anhydrous caustic soda in the solution, agitating the resulting mixture while it is maintained at a temperature between about 105° C. and the atmospheric boiling point of the caustic soda solution, and then filtering the mixture while at a temperature above about 105° C., so as to remove the calcined product together with the iron impurity from the caustic soda solution.

2. A method of removing iron impurity from aqueous caustic soda solutions containing 40 to 70 per cent of NaOH by weight which comprises calcining precipitated magnesium hydroxide at a temperature between about 950° C. and 1150° C., comminuting the resulting calcined product to a particle size passing a No. 200 standard sieve, mixing the comminuted product with the caustic soda solution in the proportions of 3 to 15 pounds thereof per ton of NaOH in the caustic soda solution, agitating the resulting mixture for not less than 10 minutes while maintaining it at a temperature between about 105° and 130° C. and then filtering the mixture while at a temperature above about 105° C. through a porous carbon filter having pore openings between 0.0003 and 0.0008 inch in diameter so as to remove the calcined product together with the iron impurity from the caustic soda solution.

3. A method of removing iron impurity from caustic soda solutions containing 40 to 70 per cent of NaOH by weight which comprises liming sea water so as to precipitate the magnesium therein as magnesium hydroxide, separating the precipitated magnesium hydroxide from the limed sea water, calcining the precipitated magnesium hydroxide at a temperature between 950° and 1150° C., until the bulk density of the calcined product comminuted to pass through a No. 100 standard sieve is at least 70 pounds per cubic foot, comminuting the calcined product to a particle size passing a No. 200 standard sieve, mixing the comminuted product with the caustic soda solution in the proportions of 3 to 15 pounds thereof per ton of NaOH in the caustic soda solution, agitating the resulting mixture for at least 10 minutes while maintaining it at a temperature between 105° and 130° C., and then filtering the mixture through a porous carbon filter so as to remove the calcined product together with the iron impurity from the caustic soda solution.

4. The method according to claim 3 in which the calcined product comprises at least 88 per cent of MgO.

WILLIAM N. SMITH.

REFERENCES CITED

The following references are of record in the file of this patent:

UNITED STATES PATENTS

| Number | Name | Date |
|---|---|---|
| 1,997,691 | Koch | Apr. 16, 1935 |
| 2,109,250 | Hooker | Feb. 22, 1938 |
| 2,132,585 | Spittle | Oct. 11, 1938 |
| 2,207,566 | Waldeck | July 9, 1940 |
| 2,309,412 | Muskat | Jan. 26, 1943 |
| 2,351,998 | Moschel | June 20, 1944 |
| 2,478,593 | Pike | Aug. 9, 1949 |

FOREIGN PATENTS

| Number | Country | Date |
|---|---|---|
| 2,022 | Great Britain | 1859 |
| 452,218 | Great Britain | Aug. 18, 1936 |

OTHER REFERENCES

"Handbook of Chemistry and Physics," 27th ed., by C. D. Hodgman, pp. 408–409. Chemical Rubber Publishing Co., Cleveland.